Figure 1:
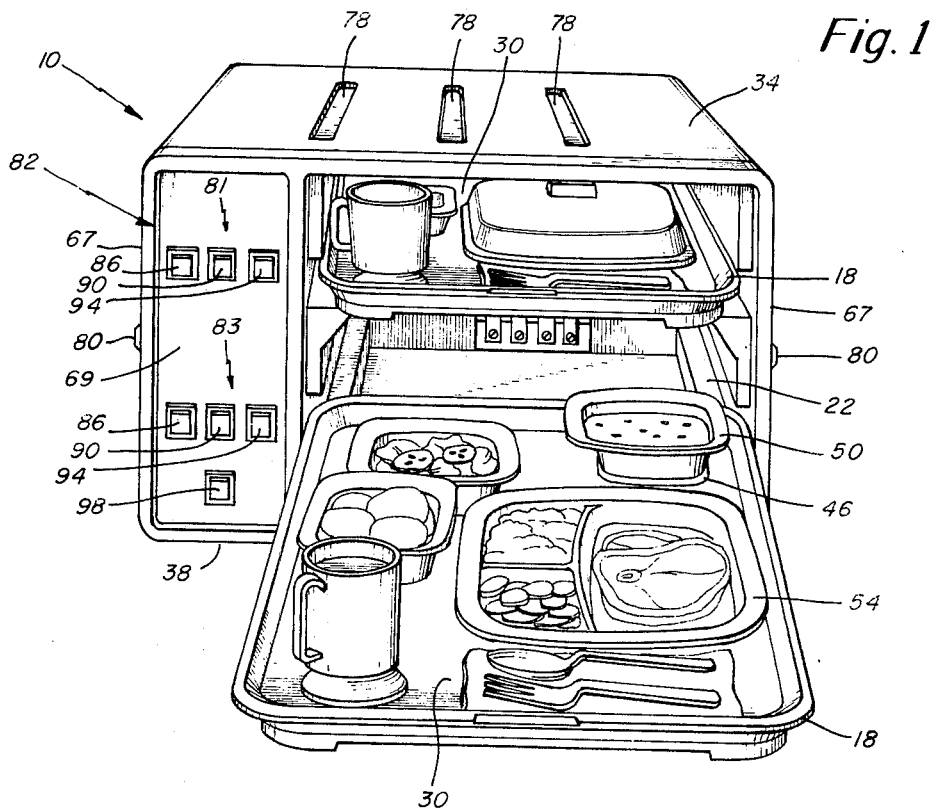

United States Patent [19]

Shumrak et al.

[11] 4,041,277
[45] Aug. 9, 1977

[54] PORTABLE TRAY WARMING UNIT

[75] Inventors: George Shumrak, Natick; Anthony Mack, North Reading, both of Mass.

[73] Assignee: Sweetheart Plastics, Inc., Wilmington, Mass.

[21] Appl. No.: 697,356

[22] Filed: June 18, 1976

[51] Int. Cl.² .......................................... F27D 11/02
[52] U.S. Cl. .................................. 219/386; 219/403; 219/521; 219/525
[58] Field of Search ............. 219/218, 385, 386, 387, 219/403, 521, 524, 525, 530; 126/246, 261, 375

[56] References Cited

U.S. PATENT DOCUMENTS

| | | | |
|---|---|---|---|
| 3,126,882 | 3/1964 | Hilfiker | 219/385 X |
| 3,408,481 | 10/1968 | Golden | 219/386 |
| 3,725,645 | 4/1973 | Shevlin | 219/521 |
| 3,908,749 | 9/1975 | Williams | 219/386 X |
| 3,916,872 | 11/1975 | Kreis et al. | 126/375 |
| 3,924,100 | 12/1975 | Mack et al. | 219/386 |
| 3,974,358 | 8/1976 | Goltsos | 219/387 |

Primary Examiner—Volodymyr Y. Mayewsky
Attorney, Agent, or Firm—Wolf, Greenfield & Sacks

[57] ABSTRACT

A portable tray warming unit comprising a casing having at least one tray supporting rack, trays to be supported and received upon said rack, and electrical terminal means for interconnecting the tray warming unit with an external electrical source of energy. The casing of this tray warming unit has dimensions and weight small enough so that the unit may be easily carried about or lifted. The upper and lower surfaces of the casing lie in planes parallel to each other so that one unit may be stacked on top of another. To further facilitate such stacking the bottom surface of a unit has protrusions extending downwardly from the bottom and these protrusions correspond to indentations in the top surface of the casing. This correspondence allows the protrusions of one unit to fit into the indentations of the unit on which it is stacked thereby assuring a non-slidable connection between the two units.

9 Claims, 7 Drawing Figures ns. 4,041,277

PORTABLE TRAY WARMING UNIT

SUMMARY AND BACKGROUND OF THE INVENTION

The present invention relates to portable tray warming units. In particular this invention relates to an auxiliary unit to be used with the food serving system described in our U.S. Pat. No. 3,924,100 issued Dec. 2, 1975 for a food serving system and assigned to the assignee of this application. The dimension and weight of the casing are small enough so that the unit may be conveniently lifted and carried about and typically may be used in an institutional feeding system as a bedside appliance to maintain food warm until the patient is ready to eat.

Our earlier U.S. Pat. No. 3,924,100 describes a food serving system that includes a motor driven cart designed to carry approximately twenty individual food serving trays which in turn carry the bowls, plates, cups, etc. for the food being served. The cart carries its own energy source which is connected automatically to heating elements in the separate trays so as to maintain the food in certain of the bowls and plates at the desired temperature. The system has general application in the institutional feeding field, and it is particularly suitable for use in hospitals, nursing homes and other institutions where meals are served at other than in central dining facilities. The present invention is described in terms of that application, but the invention is not to be so limited. When food is served by that system in hospitals, the trays are removed from the cart in the corridor and delivered to the patients' rooms. The invention of the present application is compatible with and serves as an extension of the system U.S. Pat. No. 3,924,100 and provides for the temperature maintenance of the food on the trays when the trays are removed from the cart and delivered to the hospital room.

In the past, meals delivered to patients who were not in their rooms during meal time have either been allowed to cool in the room until the patient returned or the meals have been returned to the kitchen or discarded. The present invention is designed to maintain food at the proper temperature until it is eaten and avoid the waste which now occurs.

The tray warming unit of this invention has several advantages. It provides a method of eliminating food waste, inefficient use of labor, and interference in the meal timing cycle within the hospital or other institution in which it's used. It provides immediate, on-hand service wherever it is needed such as at nursing stations or floor pantries. The unit is of table top size and plugs into a standard 115 volt wall outlet. The unit is also stackable so that several identical units may be used at one location and require only a small surface area.

The unit is designed to accept the food tray shown in applicant's earlier application, supra, and controls are provided on the unit to permit separate and selective activation of the heaters in the trays. By use of the combination of tray and unit, the food in the dishes and plates on the trays may be maintained between 140° and 160° F., the ideal serving temperature required to prevent nutritional loss and bacterial growth. While the hot food is maintained at the desired temperature, the other foods on the tray are unaffected because of the particular tray and unit design.

This invention also has application directly on the cart shown in U.S. Pat. No. 3,924,100. When the capacity of the cart falls somewhat short of what is actually required, for example 22 or 24 trays, one or two of the portable units of this invention may be stacked directly on the cart to form an extention thereof during delivery of the trays.

BRIEF FIGURE DESCRIPTION

Figure 2:
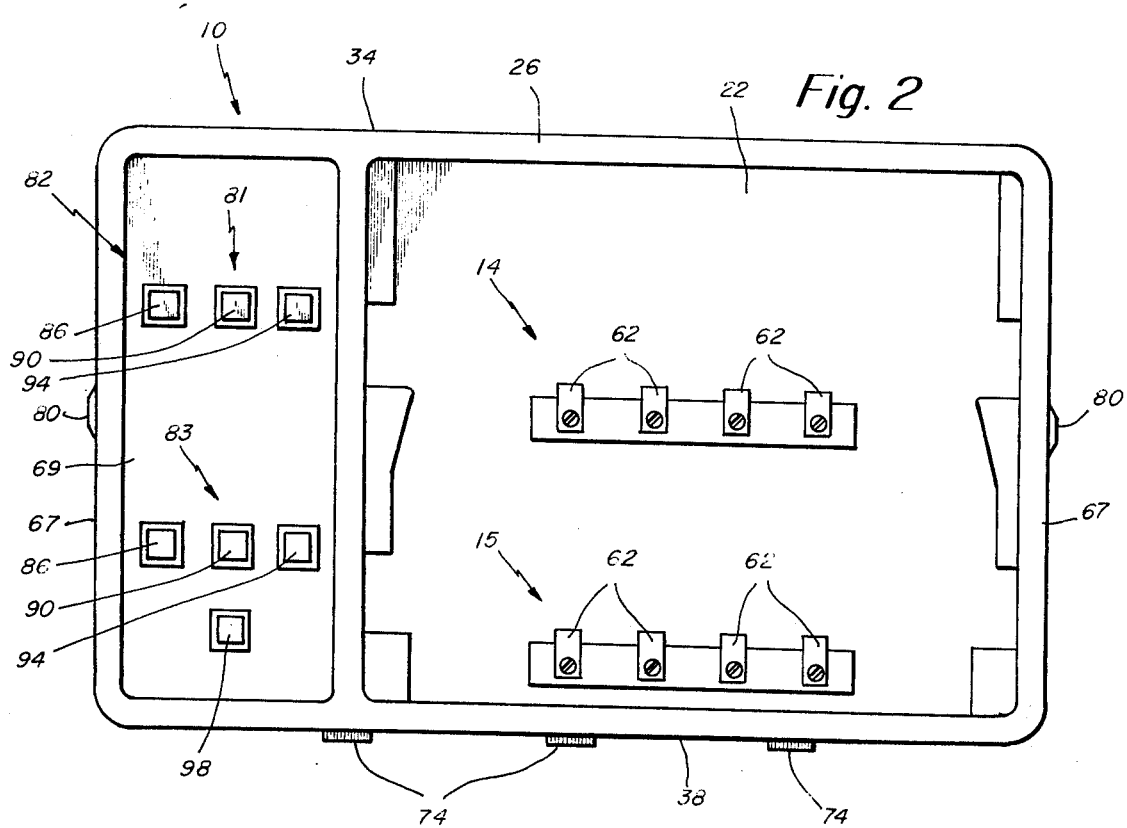
Figure 3:
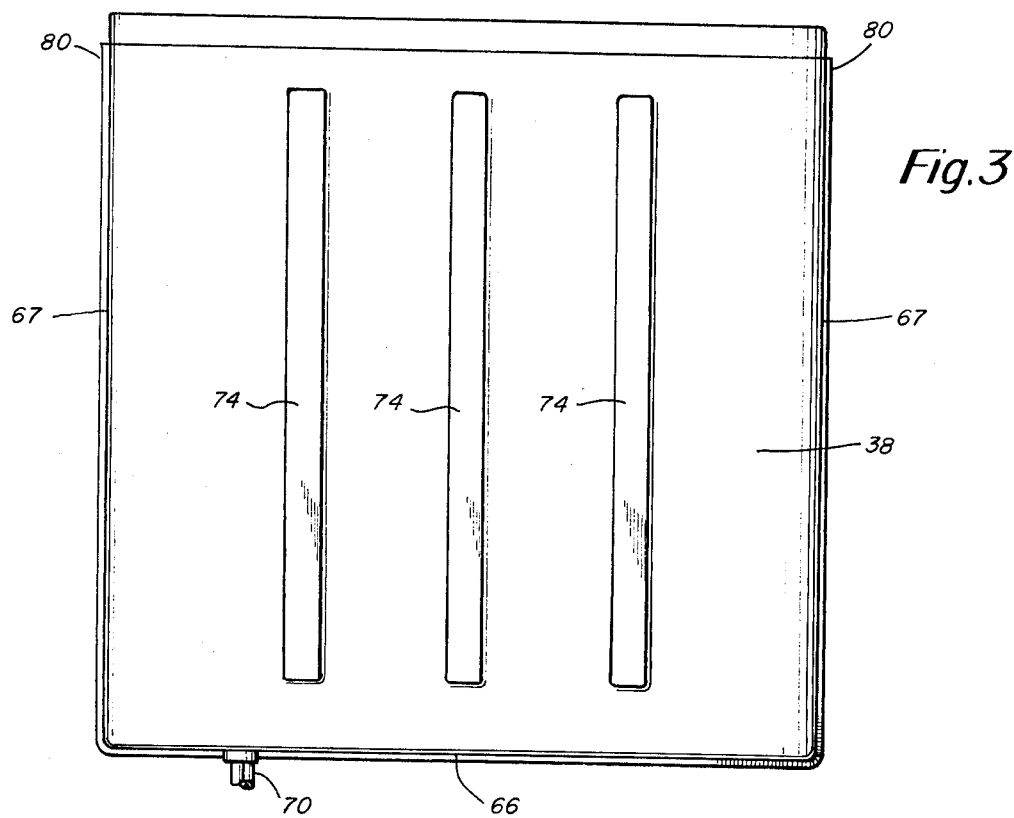
Figure 4:
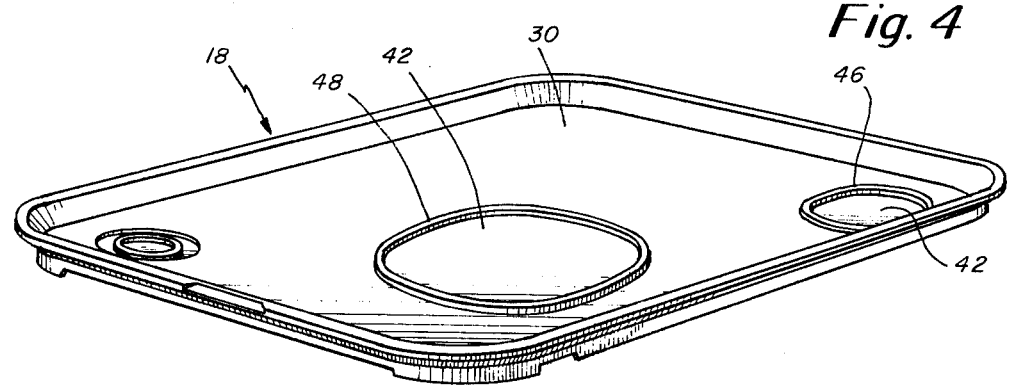
Figure 5:
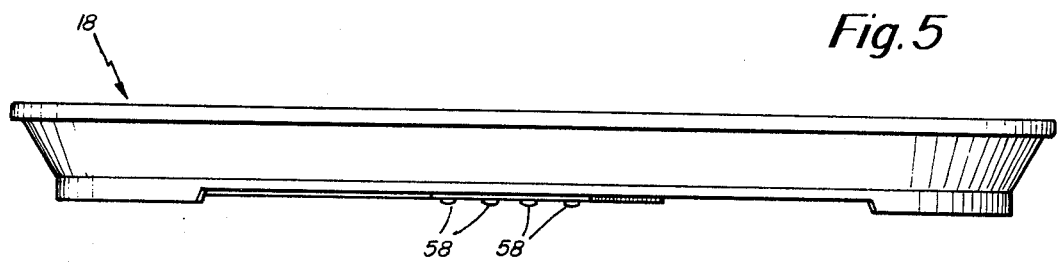
Figure 6:
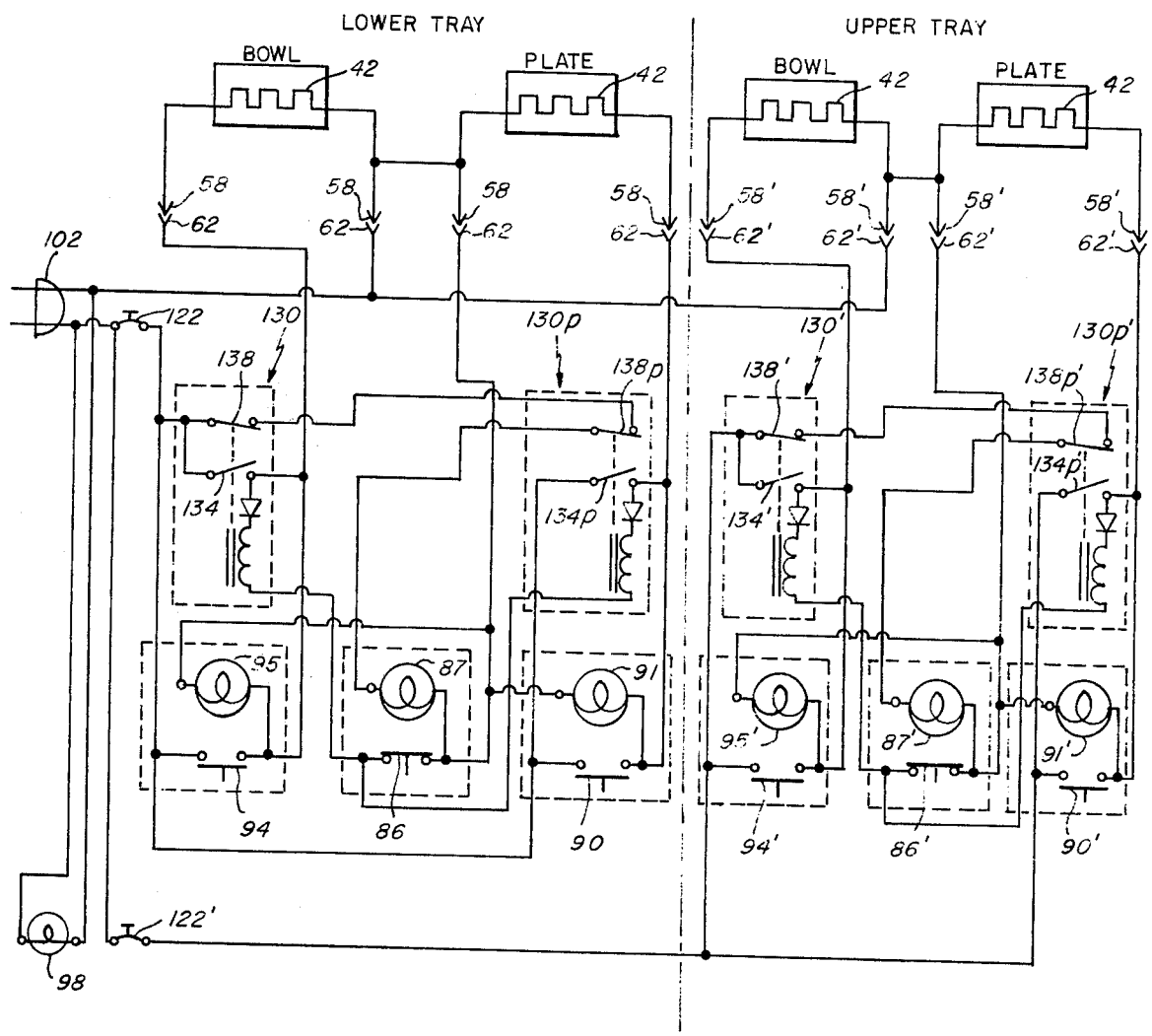
Figure 7:
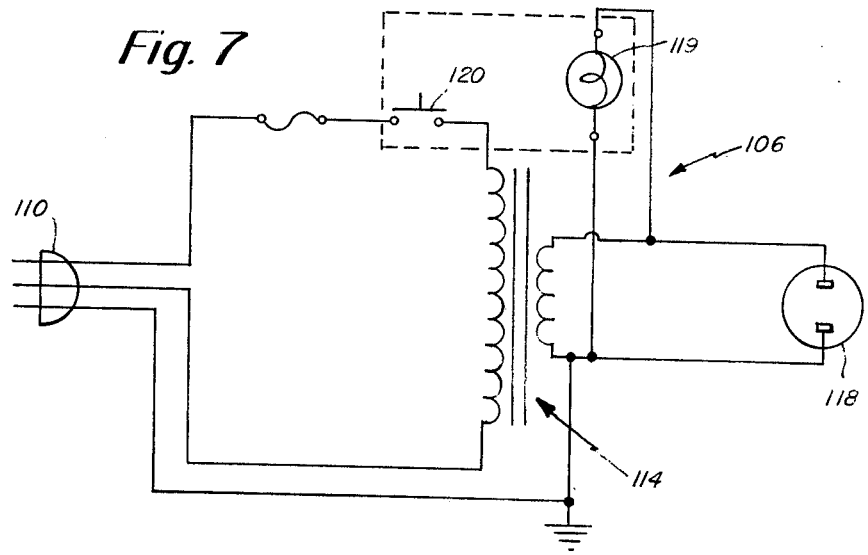

FIG. 1 is a perspective view of the tray warming unit of this invention;
FIG. 2 is a front view thereof;
FIG. 3 is a bottom view thereof;
FIG. 4 is a perspective view of the tray used in the warming unit of this invention;
FIG. 5 is an end view of the tray;
FIG. 6 is a schematic diagram of the electrical control circuit of this invention; and
FIG. 7 is a schematic diagram of the transformer circuit of this invention.

DETAILED FIGURE DESCRIPTION

The portable tray warming unit shown in the drawings comprises a casing 10 having two tray racks 14 and 15 for receiving trays 18. One tray is shown in FIG. 1 mounted on rack 14, and the second tray is shown about to be mounted on rack 15. The casing 10 is in the shape of a rectangular parallelopiped, and access is obtained to the interior 22 through the open front 26. The racks 14 and 15 are arranged so that trays 18 resting on them are maintained with their support surfaces 30 parallel to the planes in which the upper surface 34 and the lower surface 38 of the casing lie.

Each tray 18 has within its support surface 30 localized heat transfer devices 42. The tray details are described in our U.S. Pat. No. 3,924,100 and copending application Ser. No. 596,969 filed July 17, 1975. One of the heat transfer devices lies under a portion of the support surface 30 which is surrounded by a rib 46 and is of a size to receive bowl 50. Another of these heat transfer devices 42 underlies a portion of the support surface 30 of the tray which is also surrounded by a rib 48 and is of a size to receive plate 54. The rest of surface 30 is unheated and made of a poor heat conducting material, and dishes, cups, bowls, etc. placed on the support surface 30 outside of ribs 46 and 48 will not be heated, even when transfer devices 42 underlying bowl 50 and plate 54 are in operation. The trays 18 shown do not carry their own power source but rather are powered externally. To provide for such external electrical input the trays have contact points 58 which make electrical connection with the electrical spring blade terminals 62 located on the rear of the racks 14 and 15 which support the trays.

The ultimate source of electrical power for the operation of the heat transfer devices 42 in the trays 18 is external to the portable tray warming unit. The tray warming unit has a power cord 70 on its rear panel 66 that carries a plug 102 (see FIG. 6) for electrically connecting its circuits to an appropriate external electrical power source. The unit may be used with either a standard 110 volt line source through a transformer or with a 12 volt source associated for example with the cart described in U.S. Pat. No. 3,924,100, supra. The electrical power to operate the heat transfer devices 42 in the trays 18 reaches them via circuitry in the casing 10, which includes the spring blade terminals 62 and will be described more fully below.

The casing 10 is small enough and light enough so that it can be easily lifted and moved about by an operator. Typically the unit may be 20 × 20 × 12 inches and weights, empty, approximately 20 pounds.

The casing 10 of the tray warming unit has three ribs 74 extending downwardly from its lower surface 38 and a corresponding number of grooves 78 in its upper surface 34. When the tray warming unit is placed on a horizontal surface, it rests with the ribs 74 in contact with the surface. Where capacity for more than two trays is required, more than one of the portable tray warming units can be used. In order to reduce the surface area required in the use of a plurality of the units, they are designed to be stacked one upon the other. When the units are stacked, the ribs 74 on the lower surface 38 of the casing 10 of an upper unit are received in the corresponding grooves 78 located in the upper surface 34 of the next lower unit in the stack. This interlocking of units by the ribs and grooves enhances stability and reduces the risk of damage due to inadvertent tipping of the stacked tray warming units. The ribs 74 and grooves 78 extend from front to rear on the units and their extremities are rounded somewhat as is evident in FIG. 1. Consequently the units may be slid back and forth without difficulty when being stacked and unstacked, but the ribs and grooves do nevertheless provide the necessary stability.

The casing 10 of the portable tray warming unit also has resilient stripping 80 located on its side panels 67 and rear panel 66 to reduce the possibility of damage to the unit due to bumping.

The operation of the heat transfer devices 42 in the trays 18 is effected by the controls 82 located on the front panel 69 of casing 10 adjacent opening 26. Two rows of control buttons 81 and 83 are shown, one for each tray. For each tray in each row there is an "off" switch button 86, a plate switch button 90 and a bowl switch button 94. Each of these switch buttons is made of a translucent material. In order to turn on the heat transfer device 42 which underlies the bowl, the bowl switch button 94 is depressed. Similarly the heat transfer device 42 which underlies the plate is energized by depressing the plate switch button 90. When one or both of the heat transfer devices 42 of a given tray is in operation it may be turned off by operation of the off switch button 86 associated with that tray. Obviously if both heaters are operating and it is desired to retain only one in operation, the operator will first press the off button and then reactivate the desired heater by pressing the appropriate button.

In order that a user know the state of each of the heat transfer devices 42 indicator lights are associated with each switch button. When none of the heat transfer devices 42 associated with a given tray 18 is in operation off switch light 87 shown in the schematic of FIG. 6 illuminates the translucent off switch button 86. When the heat transfer device of a given tray associated with the plate 54 is in operation, a plate light 91 which illuminates the plate switch button 90 is turned on. A bowl light 95 illuminates bowl switch button 94 and indicates whether the heat transfer device underlying the bowl is in operation. Finally there is a pilot light 98 which indicates whether the unit is electrically connected with an external power source. The off switch light 87 cannot function when either plate light 91 or bowl light 95 associated with a given tray is "on".

The circuitry for this invention is shown schematically in FIGS. 6 and 7. The plug 102 for connecting the tray circuits to a power source can be directly connected to external 12 volt source which, for example, may be associated with a cart, as described in U.S. Pat. No. 3,924,100 with which the portable tray warming unit may be used. Alternatively, the plug 102 may be interconnected with the transformer circuit 106 which is shown in FIG. 7. This transformer circuit has a plug 110 for connection with a standard 110 volt outlet. Included in the transformer circuit is transformer 114, 12 volt outlet 118 to receive the 12 volt plug 102, pilot light 119 to indicate that the transformer 114 is energized, and switch 120. Obviously the transformer circuit may be housed in either a separate cabinet or within the housing 10. When plug 102 is connected to an external 12 volt source or with transformer circuit 106 the circuit for the pilot light 98 is energized.

The circuits for each of the two trays are identical, as is evident in FIG. 6, and the parts of the circuit for the upper tray have their numbers primed. Each of these two circuits is protected from overload by a circuit breaker 122 which prevents a current greater than 10 amps from flowing through the tray circuits. In FIG. 6 the tray contact points 58 which for each tray are four in number are schematically shown in contact with the electrical connecting means 62. As shown in the drawing, both the bowl heat transfer device circuit and the plate heat transfer device circuit are open by virtue of their switches 90 and 94, while the circuit including the off switch light 87 for each tray is closed by its switch 86. Thus light 87 is illuminated when neither of the heat transfer devices for a given tray 18 is energized.

When the bowl switch 94 schematically shown in FIG. 6 is momentarily engaged a circuit including the bowl relay 130 is closed. It should be noted that this circuit requires for its closure not only the presence of a tray with contact points 58 electrically interconnected with connecting means 62 but also requires that the off switch 86 be closed. The off switch 86 is yieldably biased into the closed position, and it is only open when the off switch is manually depressed. When the circuit including the bowl relay 130 is closed the transient surge of current operates the relay to close the internal switch 134 and to open the internal switch 138 associated with bowl relay. The release of the bowl switch 94 (which is yieldably biased in its open position) does not reopen the circuit including the relay 130; completion of the relay circuit is achieved by the closure of switch 134. Closed switch 134 closes the circuit which includes the heat transfer device 42 in the tray 18 which underlies the bowl 50; this circuit remains closed until switch 134 reopens. The opening of switch 138 opens the circuit including the off switch light 87 and therefore that light is extinguished and remains off while either of the heat transfer devices 42 is in operation. With the closure of the switch 134, the bowl switch light 95 is illuminated. The circuitry for the heat transfer device 42 for heating plate 54 on a tray 18 is the same as the circuitry for the heat transfer device associated with bowl 50, and the numbers carry letter $p$.

In order to deenergize the circuits associated with either or both of the heat transfer devices 42 on a given tray, the off switch button 86 is actuated, momentarily opening the off switch. As the relays 130 are in series with the off switch, when that switch is open the circuits for the relays are opened and the current ceases to flow in the relays. As a result, switch 134 opens and switch 138 closes. The opening of switch 134 turns off the heat transfer device 42 while the closing of the switch 138 lights off switch light 87. It should also be noted that removal of a tray from the rack so that the contact between the tray contact points 58 and the electrical connecting means 62 is broken also opens the circuits which include the relays 130. Thus, if switch 134 were closed and switch 138 were opened, the removal of the tray would operate the relay to open switch 134 and close switch 138. Thus, either by operating the off switch or by removing the appropriate tray the switch 134 is opened and the switch 138 is closed, the heat transfer devices are deenergized, the bowl switch light 95 and the plate switch light 91 are turned off and the off switch light 87 is relighted. Since the switch 134 cannot be in an on position unless the tray 18 is in place, risk of even a minor electrical shock from the contacts 62 is minimized since these cannot be part of a closed circuit unless switch 134 is closed.

From the foregoing description it will be appreciated that the unit of this invention may be used either with a cart of the type shown in U.S. Pat. No. 3,924,100 or alone, plugged into a transformer circuit of FIG. 7. And merely be placing one or two trays on the racks in the unit and actuating the appropriate push button switches, the unit may be programmed to perform a temperature maintenance function. And by virtue of the tray construction and localized application of heat, the temperature of the food in dishes not on the heated portions of the tray will not be affected.

Those skilled in the art will appreciate that modifications of this invention may be made without departing from the spirit of this invention. Therefore, it is not intended that the scope of this invention be limited to the specific embodiment illustrated. Rather, it is to be determined by the appended claims and their equivalents.

What is claimed is:

1. A portable tray warming unit comprising
   a casing having at least one tray supporting rack, said casing being of dimensions such that it is convenient for lifting and carrying by a single user,
   said casing having an opening for providing access to said rack,
   terminal means connected to said casing for receiving energy from an energy source external to said unit,
   at least one tray constructed and arranged to be removably supported on the rack and having a supporting surface which receives food receptacles,
   said tray having at least one localized heat transfer device in said surface,
   said surface of said tray having a substantial portion free of said heat transfer devices,
   electrical connecting means for supplying energy from said terminal in the casing to the heat transfer device in the surface of said tray to energize said device when the tray is in place on said rack in the casing,
   at least one food receptacle, for removable placement on said surface of said tray, constructed and arranged to be in a heat exchanging relationship with said localized heat transfer device in said tray so as to transmit heat between the device and food contained in said food receptacle,
   an upper surface of said casing being capable of supporting the lower surface of an identical tray warming unit and each upper and lower surface carrying complementary means for registration and interlocking with other like tray warming units,
   said terminal means including means for electrically connecting said unit to a low voltage outside source.

2. A portable tray warming unit as characterized in claim 1 further characterized by
   said unit having a weight not exceeding that which can be easily lifted by an average user.

3. A portable tray warming unit as characterized by claim 2 further characterized by
   the front of said casing having an opening providing access to said rack.

4. A portable tray warming unit as characterized by claim 3 further characterized by
   said casing having controls whereby said heat transfer device can be energized or deenergized when said terminal means is connected to an outside power source.

5. A portable tray warming unit as described in claim 1 further characterized by
   said casing having two substantially identical tray supporting racks capable of supporting the same tray.

6. A portable tray warming unit as described in claim 5 further characterized by
   said unit having a weight not exceeding approximately 20 pounds,
   the front of said casing having an opening providing access to the racks.

7. A portable tray warming unit comprising
   a casing having at least one tray supporting rack, said casing being of dimensions such that it is convenient for lifting and carrying by a single user,
   said casing having an opening for providing access to said rack,
   terminal means connected to said casing for receiving energy from an energy source external to said unit,
   at least one tray constructed and arranged to be removably supported on the rack and having a supporting surface which receives food receptacles,
   said tray having at least one localized heat transfer device in said surface,
   said surface of said tray having a substantial portion free of said heat transfer devices,
   electrical connecting means for supplying energy from said terminal in the casing to the heat transfer device in the surface of said tray to energize said device when the tray is in place on said rack in the casing,
   at least one food receptacle, for removable placement on said surface of said tray, constructed and arranged to be in a heat exchanging relationship with said localized heat transfer device in said tray so as to transmit heat between the device and food contained in said food receptacle,
   an upper surface of said casing being capable of supporting the lower surface of an identical tray warming unit,
   said terminal means including means for electrically connecting said unit to a low voltage outside source,
   said upper surface of said casing having a plurality of indentations,
   said lower surface of said casing having a plurality of protrusions extending downwardly therefrom,
   said protrusions having lower extremities all lying in a plane which is parallel to that in which said upper surface lies,
   said protrusions in said bottom surface corresponding which said indentations on said upper surface so that when one tray warming unit is placed on another, said protrusions on the top unit are received by the indentations on the upper surface of the lower unit.

8. A portable tray warming unit comprising a casing having at least one tray supporting rack, said casing being of dimensions such that it is convenient for lifting and carrying by a single user, said casing having an opening for providing access to said rack, terminal means connected to said casing for receiving energy from an energy source external to said unit, at least one tray constructed and arranged to be removably supported on the rack and having a supporting surface which receives food receptacles, said tray having at least one localized heat transfer device in said surface, said surface of said tray having a substantial portion free of said heat transfer devices, electrical connecting means for supplying energy from said terminal in the casing to the heat transfer device in the surface of said tray to energize said device when the tray is in place on said rack in the casing, at least one food receptacle, for removable placement on said surface of said tray, constructed and arranged to be in a heat exchanging relationship with said localized heat transfer device in said tray so as to transmit heat between the device and food contained in said food receptacle, an upper surface of said casing being capable of supporting the lower surface of an identical tray warming unit, said terminal means including means for electrically connecting said unit to a low voltage outside source, said casing having controls whereby said heat transfer device can be energized or deenergized when said terminal means is connected to an outside power source, said upper surface of said casing having a plurality of indentations, said lower surface of said casing having a plurality of protrusions extending downwardly therefrom, said protrusions having lower extremities all lying in a plane which is parallel to that in which said upper surface lies, said protrusions in said lower surface corresponding with said indentations on said upper surface so that when one tray warming unit is placed on another, said protrusions on the top unit are received by the indentations on the upper surface of the lower unit.

9. A portable tray warming unit comprising a casing having at least one tray supporting rack, said casing being of dimensions such that it is convenient for lifting and carrying by a single user, said casing having an opening for providing access to said rack, terminal means connected to said casing for receiving energy from an energy source external to said unit, at least one tray constructed and arranged to be removably supported on the rack and having a supporting surface which receives food receptacles, said tray having at least one localized heat transfer device in said surface, said surface of said tray having a substantial portion free of said heat transfer devices, electrical connecting means for supplying energy from said terminal in the casing to the heat transfer device in the surface of said tray to energize said device when the tray is in place on said rack in the casing, at least one food receptacle, for removable placement on said surface of said tray, constructed and arranged to be in a heat exchanging relationship with said localized heat transfer device in said tray so as to transmit heat between the device and food contained in said food receptacle, an upper surface of said casing being capable of supporting the lower surface of an identical tray warming unit, said terminal means including means for electrically connecting said unit to a low voltage outside source, said casing having two substantially identical tray supporting racks capable of supporting the same tray, said unit having a weight not exceeding approximately 20 pounds, the front of said casing having an opening providing access to the racks, said upper surface of said casing having a plurality of indentations, said lower surface of said casing having a plurality of protrusions extending downwardly therefrom, said protrusion having lower extremities all lying in a plane which is parallel to that in which said upper surface lies, said protrusion in said lower surface corresponding with said indentations on said upper surface so that when one tray warming unit is placed on another, said protrusions on the top unit are received by the indentations on the upper surface of the lower unit.

* * * * *